United States Patent
Lim et al.

(10) Patent No.: US 9,911,174 B2
(45) Date of Patent: Mar. 6, 2018

(54) MULTI-RATE PROCESSING FOR IMAGE DATA IN AN IMAGE PROCESSING PIPELINE

(71) Applicant: Apple Inc., Cupertino, CA (US)

(72) Inventors: Suk Hwan Lim, Mountain View, CA (US); Christopher L. Mills, Saratoga, CA (US); D. Amnon Silverstein, Palo Alto, CA (US); David R. Pope, Fremont, CA (US); Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/836,915

(22) Filed: Aug. 26, 2015

(65) Prior Publication Data

US 2017/0061567 A1    Mar. 2, 2017

(51) Int. Cl.
*G06T 1/20* (2006.01)
*H04N 5/376* (2011.01)
*H04N 5/917* (2006.01)
*H04N 9/04* (2006.01)
*H04N 5/232* (2006.01)
(Continued)

(52) U.S. Cl.
CPC ............... *G06T 1/20* (2013.01); *G06T 1/60* (2013.01); *G06T 3/4015* (2013.01); *H04N 5/23229* (2013.01); *H04N 5/3765* (2013.01); *H04N 5/917* (2013.01); *H04N 9/045* (2013.01)

(58) Field of Classification Search
None
See application file for complete search history.

(56) References Cited

U.S. PATENT DOCUMENTS 6,014,125 A    1/2000  Herbert
6,407,723 B1   6/2002  Okuno et al.
(Continued)

FOREIGN PATENT DOCUMENTS

EP    1414249      4/2004
WO    2007120928   10/2007
WO    2015055093   4/2015

OTHER PUBLICATIONS

International Search Report and Written Opinion from PCT/US2016/048892, dated Nov. 29, 2016, Apple Inc., pp. 1-13.
(Continued)

*Primary Examiner* — Roberto Velez
*Assistant Examiner* — Quan Pham
(74) *Attorney, Agent, or Firm* — Robert C. Kowert; Meyertons, Hood, Kivlin, Kowert & Goetzel, P.C.

(57) ABSTRACT

An image processing pipeline may process image data at multiple rates. A stream of raw pixel data collected from an image sensor for an image frame may be processed through one or more pipeline stages of an image signal processor. The stream of raw pixel data may then be converted into a full-color domain and scaled to a data size that is less than an initial data size for the image frame. The converted pixel data may be processed through one or more other pipelines stages and output for storage, further processing, or display. In some embodiments, a back-end interface may be implemented as part of the image signal processor via which image data collected from sources other than the image sensor may be received and processed through various pipeline stages at the image signal processor.

20 Claims, 6 Drawing Sheets

(51) Int. Cl.
   *G06T 1/60*   (2006.01)
   *G06T 3/40*   (2006.01)

(56) References Cited

U.S. PATENT DOCUMENTS

| | | | |
|---|---|---|---|
| 6,980,208 B1 * | 12/2005 | Montrym | G06T 15/005 345/422 |
| 7,830,391 B2 | 11/2010 | Champion et al. | |
| 7,953,281 B2 | 5/2011 | Yoshida et al. | |
| 8,713,082 B1 | 4/2014 | Szanto et al. | |
| 2007/0025644 A1 | 2/2007 | Wang et al. | |
| 2009/0003730 A1 | 1/2009 | Pande et al. | |
| 2012/0081577 A1 * | 4/2012 | Cote | H04N 19/80 348/231.99 |
| 2013/0004071 A1 * | 1/2013 | Chang | H04N 5/23241 382/167 |
| 2013/0286242 A1 * | 10/2013 | Cote | H04N 5/2256 348/222.1 |
| 2014/0098857 A1 | 4/2014 | MacInnis et al. | |
| 2014/0365620 A1 * | 12/2014 | Lindberg | H04L 65/60 709/219 |

OTHER PUBLICATIONS

Emil Talpes, et al., "Increased Scalability and Power Efficiency by Using Multiple Speed Pipelines", 2013 21st International Conference on Program Comprehension (ISCA), IEEE, May 1, 2005, pp. 310-321.

* cited by examiner

MULTI-RATE PROCESSING FOR IMAGE DATA IN AN IMAGE PROCESSING PIPELINE

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera or other image sensor capable of capturing image data may, in some embodiments, be configured to process image data at different rates. Some image processing pipeline stages may process a stream of pixel data of a captured image frame at an initial rate (e.g., at X pixels per clock cycle). For example, various raw image data processing techniques may be performed at one or more pipeline stages at the initial rate. Back-end image processing pipeline stages may then process the stream of pixel data at a reduced rate (e.g., at Y pixels per clock cycle where Y<X). Consider the raw image data processed in the above example. The raw image data may be converted to a full-color domain, scaled to a smaller image size, and processed through back-end full-color pipeline stages at the reduced rate. An interface may also be included which allows image data to be obtained from a memory and processed through the back-end image processing pipeline stages (even if the image data was not collected by the camera, like a video received from a remote device or server).

Figure 1:
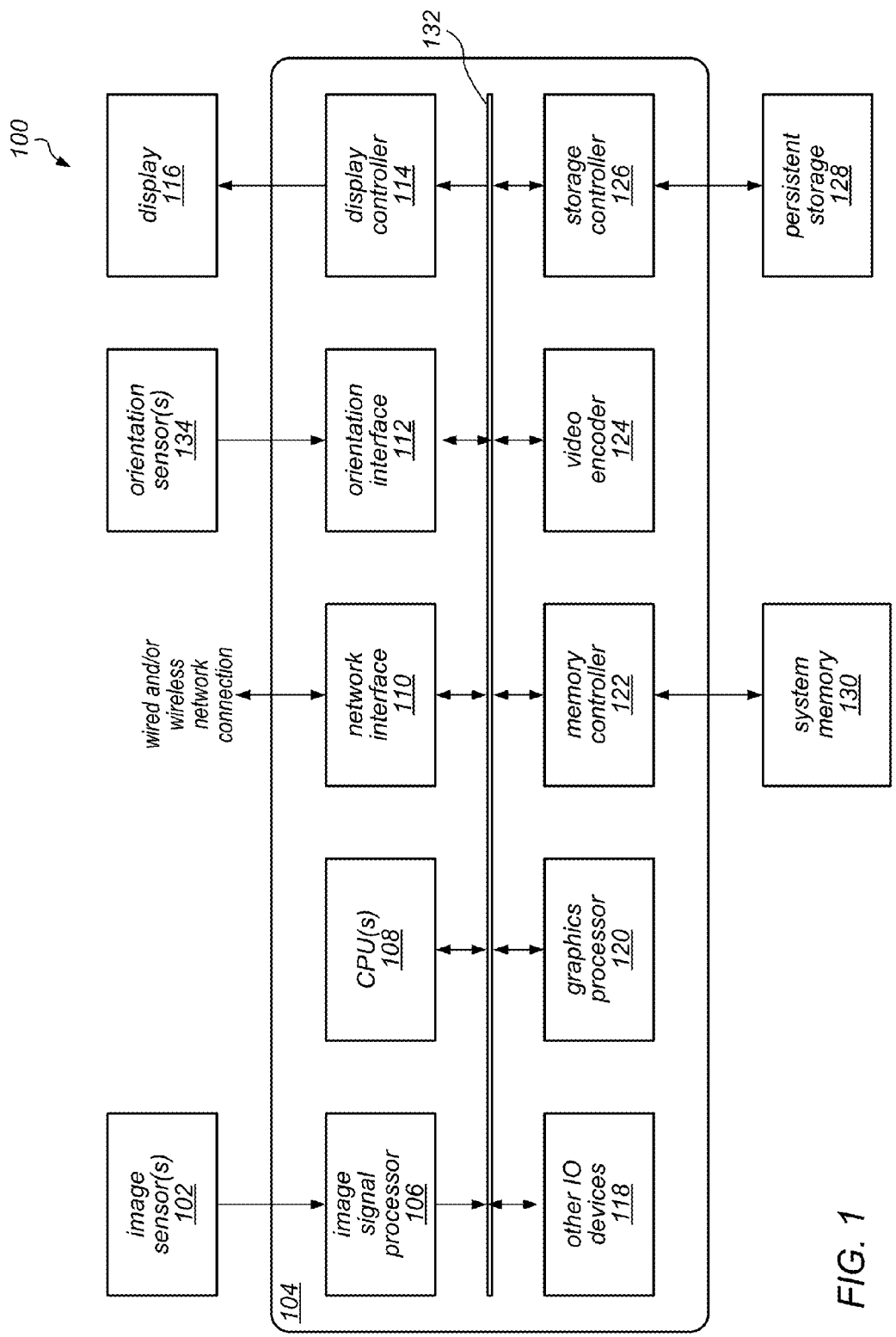
FIG. 1 is a logical block diagram illustrating an example system that may implement an image processing pipeline that processes image data at multiple rates, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to correct or enhance image data captured by an image sensor. However, image data captured by the image sensor is not always utilized for the same purposes. For example, an image sensor may provide a stream of image data in order to display a preview image of what may be captured by the image sensor in a higher resolution still image or can be recorded in a video. Depending on the desired effects or formats according to which image data captured by the image sensor may be processed, different portions of an image processing pipeline that processes the image data may be over or under-utilized. For example, for image data captured by a high-resolution image sensor that is being recorded as part of a lower resolution video file, some portions of an image processing pipeline may be over utilized (e.g., those portions of the pipeline processing the full-resolution image data which may be ultimately discarded in order to scale the image for the low resolution video).

In various embodiments, the image signal processor may process image data in an image processing pipeline at multiple rates in order to more efficiently leverage the processing capabilities of the image processing pipeline. For instance, in at least some embodiments one or more front-end pipeline stages may process image data at an initial rate, such as 2 pixels per clock cycle (ppc). In this way large amounts of image data (e.g., either as large individual image frames or a high rate of image frames, such as may be captured when recording slow motion video) may receive initial processing to reduce or correct image signal noise, artifacts, and other image defects that may be introduced as a result of collecting and processing image data. The image data may then be downscaled to a desired size and processed at a different rate, such as 1 ppc, at one or more back-end pipeline stages to perform other operations on the image frames in order to reduce image signal noise, correct color and image defects, as well as apply various special effects, so that processing is not performed upon image data that may be discarded.

In at least some embodiments, image data captured and processed through front-end pipeline stages may be stored in raw or full-color formats to a memory, while a scaled version of the image data may continue to be processed through the back-end pipeline stages of the image processing pipeline. In this way, high-resolution versions of image frames with some image processing may be captured while simultaneously continuing processing for lower resolution versions of the image frames (e.g., capturing high resolution stills of image frames that are also recorded in a lower resolution video).

In at least some embodiments, a back-end interface may be implemented to allow image data collected from sources different than the image sensor to be processed through back-end pipeline stage(s) of the image processing pipeline. For instance, image data received at a device that implements the image processing pipeline (e.g., a mobile computing device) from a remote device (e.g., a content server of a content provider, such as a web-based video service) may be received via the back-end interface and processed through the back-end pipeline stage(s) in order to perform operations to reduce image signal noise, correct color and image defects, or apply various special effects. In this way, the dedicated image processing components of the image processing pipeline may be utilized to efficiently perform image processing for image data received from many other sources.

The techniques described herein for processing image data in an image processing pipeline at multiple rates may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD or OLED). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors or several processing cores (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
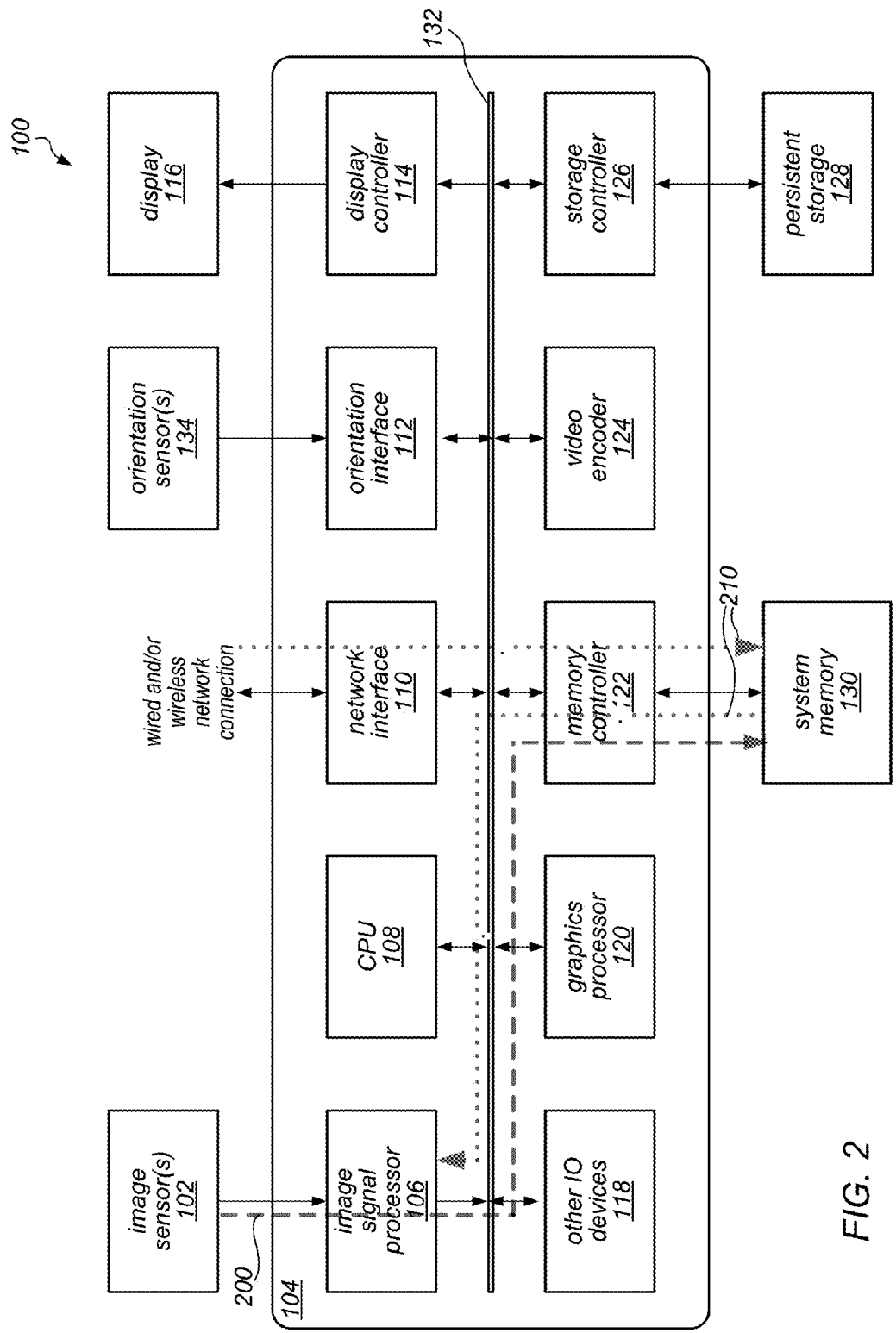
FIG. 2 is a logical block diagram illustrating example data paths in a system that may implement an image processing pipeline that processes image data at multiple rates, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received by system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.

Figure 3:
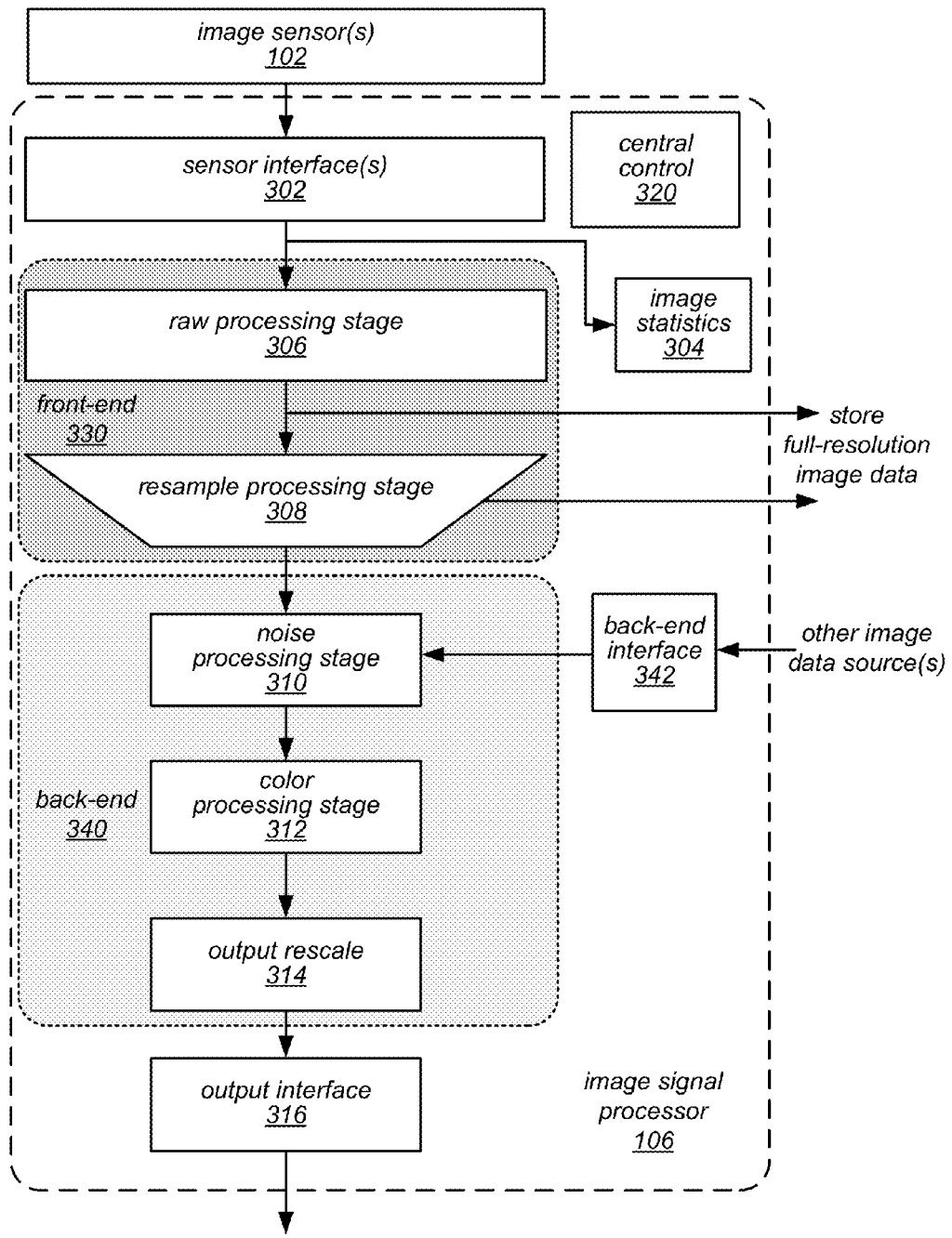
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct patterned defects and defect line pairs (e.g., created by special pixels like focus pixels), and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 308 operations like black level compensation, highlight recovery, defective pixel correction, and others, may process 2 pixels of image data at a time.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. Please note that back-end interface 342, as discussed below with regard to FIG. 6, may convert from various color formats, and thus the previous examples are not intended to be limiting.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full-color domain format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments perform sensor linearization, defective pixel replacement, black level compensation, lens shading correction, and inverse black level compensation in order to collect image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixels' values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full-color domains. Raw processing stage 308 may, in various embodiments implement a variety of modules, units, or components to perform various operations, functions, or tasks on raw image data. Bayer raw format, for example, may be image data collected from image sensor(s) 102 that implement a Bayer pattern of pixel sensors. For instance, some pixel sensors only capture green light, while other pixel sensors capture red or blue light in Bayer pattern of pixels. In this way, image data in Bayer raw image format (or other raw image format captured by a color filter array in an image sensor) provides pixel data with values specific to a particular color (instead of all colors).

Raw processing stage 308 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr,R,B,Gb) on the pixels' image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr,R,B,Gb in Bayer format). Please note that various examples and descriptions provided above are not intended to be limiting as to the various techniques, components, or formats of raw processing stage 308 but are instead merely provided as examples. Various components, units, or modules may be broken apart into multiple different pipeline processing stages. Also note that in some embodiments, various ones of the components, units, or modules may convert raw image data into full-color domain, and thus raw processing stage 308 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306, as discussed in further detail below with regard to FIG. 4, and may provide as output image data accordingly at a reduced rate such as may be processed by a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate>3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiment implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-6) may be implemented in various combinations of hardware or software.

Figure 4:
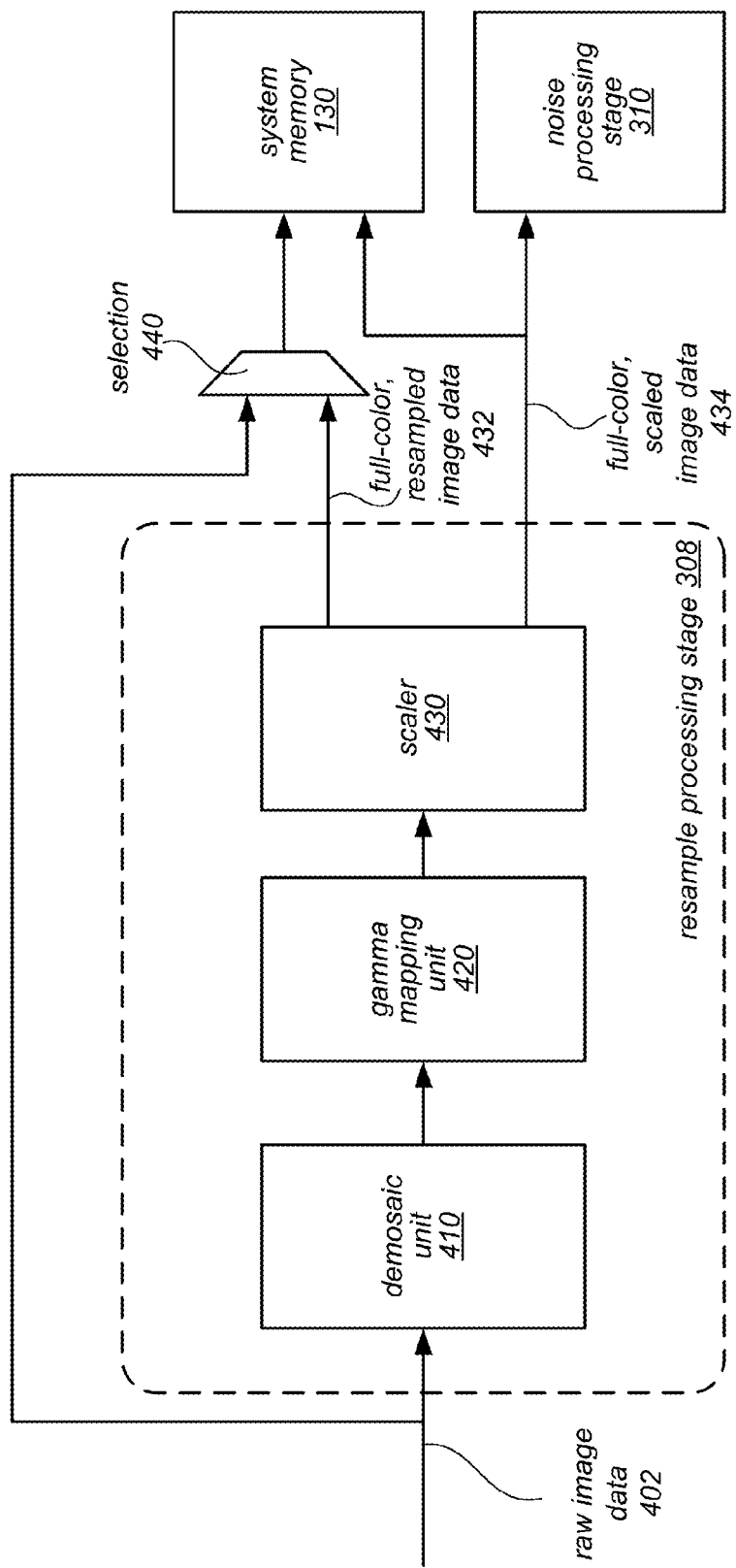
FIG. 4 is a logical block diagram illustrating a resample processing stage in an image signal processor, according to some embodiments.

As noted above, in various embodiments different stages may be configured to process image data at different rates, such as front-end pipeline stages 330 processing image data at an initial rate and back-end pipeline stages 340 processing image data at a reduced rate. Resample processing stage 308 may, in various embodiments, be configured to receive image data from raw processing stage at the initial data rate, process the image data, and provide output image data at the reduced image rate. FIG. 4 is a logical block diagram illustrating a resample processing stage in an image signal processor, according to some embodiments.

Raw image data 402 may be received from raw processing stage 306 (or from another input such as a memory for processing at resample processing stage 308. As with raw processing stage resample processing stage 308 may process image data at the initial rate described above. Thus, demosaic unit 410, gamma mapping unit 420, and scaler 430 may process input image data according to the initial data rate. In various embodiments, scaler 430 may provide one or more multiple outputs of image data at the same or different rates. For instance, in some embodiments, scaler 430 may provide image data that is in the full-color domain and scaled 434 at a reduced rate to noise processing stage 310 for further processing. In some embodiments, the full-color scaled image data 434 may be additionally (or alternatively) written to system memory 130 to be stored for future processing or display. In at least some embodiments, scaler 430 may provide full-color image data that has been resampled (if not downscaled) as output (in addition to or instead of full-color scaled image data 434). For example, scaler 430 may subsample full resolution image data in YCbCr 4:4:4 format to YCbCr 4:2:2 format, reducing the chrominance color components (without reducing the luminance color component) and provide the full resolution image data in the subsampled format as output.

In some embodiments, selection component 440 may be implemented so that central control module 320, or another component, may program image signal processor 106 to store raw image data 402 in system memory 130 or full-color resampled image data 432. In this way, a version of image data that is not scaled (e.g., a full resolution image) may be stored in memory in raw or full-color format, while a scaled version of the image continues processing as full-color scaled image data 434 at other pipeline stages. For instance, an image frame may be captured at full resolution and saved as a high resolution image and processed and displayed as a lower resolution preview image. In another example, a high resolution image frame may be captured while processing a lower resolution version of the image frame to be stored as part of a video file (e.g., a 1080p video file).

Demosaic unit 410 may convert or interpolate missing color samples from raw image data 402 to output image data into a full-color domain. For instance, as discussed above, raw image data 402 may not include multiple color components or channels for an individual pixel (e.g., the pixel is a green, red, or blue pixel in a Bayer pattern) when collecting image data from an image sensor, such as a color filter array (CFA). A full-color domain, as noted earlier, may include multiple color channels or components for an individual pixel in order to provide a color value for the pixel within a color space that is greater than any one color channel or component (e.g., color spaces that include red, blue, and green color combinations). In some embodiments, demosaic unit 410 performs interpolation based on a Bayer CFA pattern. For example, demosaic unit 410 may use a 5×5 edge-adaptive filter working on original image sensor samples to perform green channel interpolation. A low pass directional filter may be applied to a green pixel value and a high pass (or gradient) filter may be implemented on the color channel adjacent to green on the same row (either red or blue depending on the row on which the green pixel is located). For interpolating the red and blue channels, demosaic unit 410 may implement a low pass filter of the red or blue pixel value along with a high pass filter using the interpolated green values adjacent to the red or blue pixel. In some embodiments, green non-uniformity correction may be implemented as part of demosaic unit 410 in order to account for brightness differences between green pixel values adjacent to red pixels and green pixels adjacent to blue pixels.

Gamma mapping unit 420 may be implemented, in some embodiments, as part of resample processing stage 308 and may receive the converted image data from demosaic unit 410 as input. Gamma mapping unit 420 may map the converted image data from input image data values to output data values in order to perform special image effects, including black and white conversion, sepia tone conversion, negative conversion, or solarize conversion. For example, gamma mapping unit 420 may utilize lookup tables (or other structures that index pixel values to another value) for different color components or channels of each pixel (e.g., a separate lookup table for Y, Cb, and Cr color components). These values represent the output levels which may map an input pixel value to a low and a high mapping value. The output value for the input pixel value may be determined by performing a linear interpolation between the low and high mapping values for the input pixel. Central control module 320 may configure the lookup table values (or other gamma mapping unit 420 control parameters) to map values that correspond to applying the various special effects.

Resample processing stage 308 may implement scaler 430 to receive image data from gamma mapping unit 420 (or from demosaic unit 410 (not illustrated)) to perform various scaling, resampling, or other image data operations on the converted image data in the full-color domain. In at least some embodiments, scaler 430 may operate in multiple modes which provide different types of scaled, resampled, or otherwise modified image data output. For instance, scaler 430 may provide a mode that corrects or suppresses artifacts in the image data (e.g., such as suppressing chroma aliasing artifacts to remove the aliasing artifacts near luminance edges that may have been introduced by the demosaic unit 410 or removing dot artifacts introduced by the demosaic unit 410) without scaling the image data (though the output of scaler 430 may still provide the image data according to a reduced rate as discussed above). Another mode for scaler 430 mode may perform image downscaling and resampling (in addition to, or instead of, correcting or suppressing artifacts in the image data), in some embodiments. For example, scaler 430 may receive as input image data in a YCbCr 4:4:4 format and downsample the image data into YCbCr 4:2:2 format (which may reduce the CbCr (chrominance) data to half that of Y (luminance)). Scaler 430 may then downscale the reformatted image data (e.g., by performing vertical and horizontal resampling), changing the image size from one resolution (e.g., a full-sensor resolution image) to a different resolution (e.g., a video resolution, such as 1080p). In some embodiments, scaler 430 may also correct or suppress artifacts in the scaled image data as discussed above. Central control module 320 may, in various embodiments, configure the mode or other operations, such as the downscaled size of the image data that may be performed by scaler 430 on input image data.

Please note that FIG. 4 is provided as merely an example of a resample processing stage 308. Different combinations of the illustrated components (as well as components not illustrated) may be used to perform conversion from raw image data into a full-color domain or scale image data. For example, in some embodiments output selection component 440 may not be implemented. Thus, the components of FIG. 4 and their respective layout or ordering is not intended to be limiting to the various other combinations which may be used to resample processing stage 308.

Figure 5:
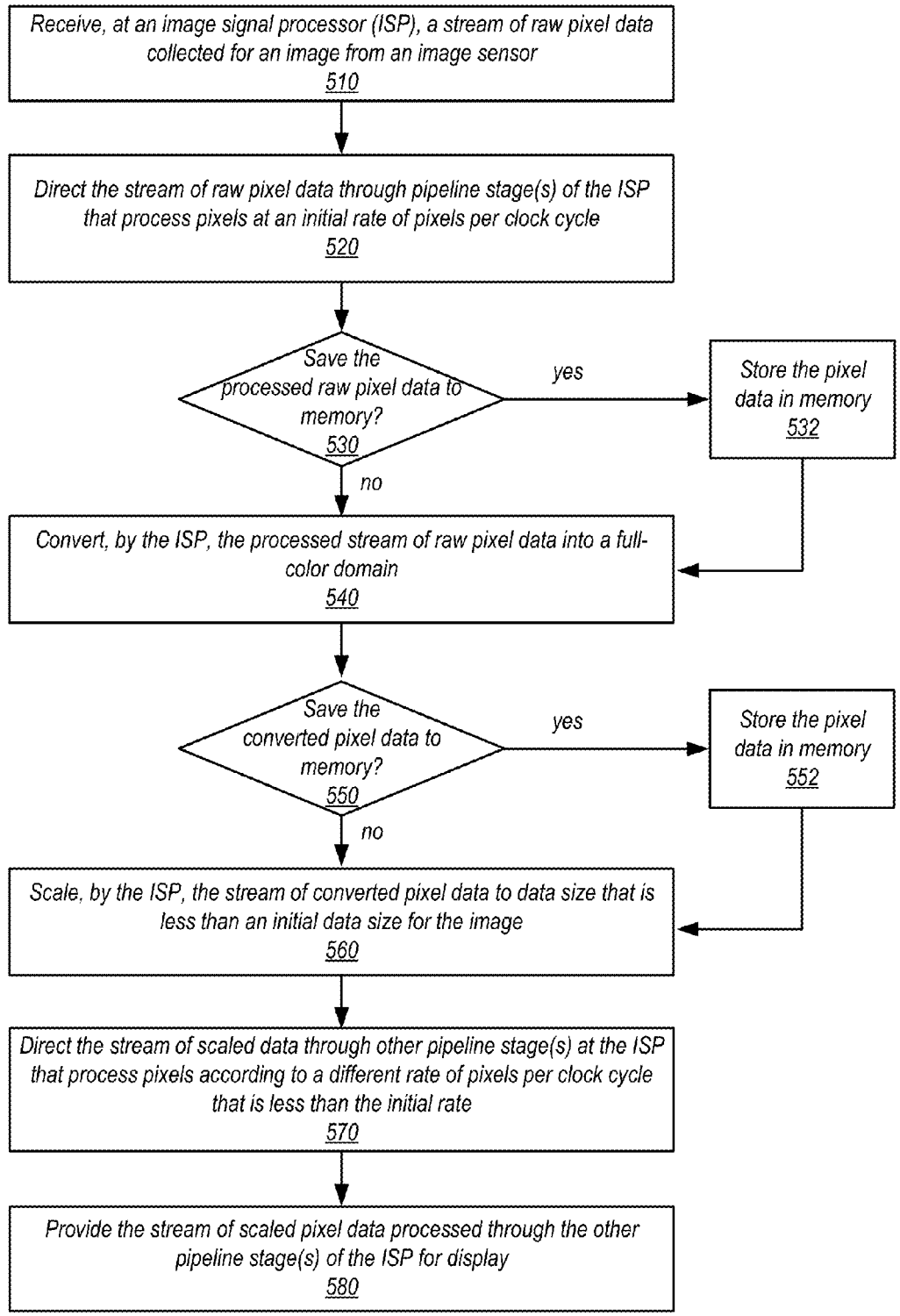
FIG. 5 is a high-level flowchart illustrating various methods and techniques for processing image data in an image processing pipeline at multiple rates, according to some embodiments.

FIGS. 1-4 provide an example of an image processing pipeline, image signal processor, and system which may implement multi-rate processing for image data in an image processing pipeline. However, numerous other types or configurations of systems or devices that implement an image processing pipeline and image signal processor may perform multi-rate processing for image data. FIG. 5 is a high-level flowchart illustrating various methods and techniques for processing image data in an image processing pipeline at multiple rates, according to some embodiments. The various components described above may implement these techniques (in addition to those described with regard to FIG. 6 below) as well as various other image processing pipelines and image signal processors.

As indicated at 510, a stream of raw pixel data collected from an image sensor may be received at an image signal processor (ISP). Raw pixel data may be captured and processed in stream fashion as it is collected at an image sensor. Raw image pixel data, as discussed above, may be formatted such that multiple color components or channels are not included for an individual pixel. One example of raw image data is a Bayer image format (of which there may be many variations) that includes different rows of pixel values for collecting light in different colors, green, red, and blue, which depend on the configuration of the image sensor. These pixel values (e.g., green values, red values, or blue values) may be collected and provided in raster order to the image signal processor, in some embodiments.

As indicated at 520, the stream of raw pixel data may be directed through pipeline stage(s) that process pixels at an initial rate of pixels per clock cycle (ppc). For instance, the pipeline stage(s) may process pixel data at 4 ppc. Pipeline stage(s) may be one or more collections of units, components, or other processing operations performed upon the stream of raw image data at the ISP. The pipeline stages may, in some embodiments, be the various stages or components in front-end 330, discussed above with regard to FIG. 3. For instance, sensor linearization, black level compensation, fixed pattern noise reduction, defective pixel correction, raw noise filtering, lens shading correction, white balance gain, highlight recovery, demosaic, or gamma mapping may be performed at the initial rate of pixels per clock cycle.

In some embodiments, the raw pixel data processed through some or all of the pipeline stage(s) (as discussed with regard to 510 above) may be saved to a memory. For example, a raw format full-resolution image captured by the stream of raw pixel data may be saved to memory if a control unit, or other programmable component directs the ISP to store the processed stream of raw pixel data to memory, as indicated at 532. In this way other components, such as a CPU or GPU may perform image processing on the raw image data by accessing the memory. Alternatively, the raw image data may be retrieved from memory and continue processing through the various ISP elements discussed below at a later time. Whether the image data is stored to memory or not, the raw image data may continue processing through subsequent image processing stages (as indicated by the arrow from 532 to 540 or the negative exit from 530). Note that image data may continue processing while it is also being stored to a memory and thus the various elements as illustrated in FIG. 5 do not preclude the possibility of performing certain elements in parallel.

The ISP may, in various embodiments, convert the processed stream of raw pixel data into a full-color domain, as indicated at 540. For example, assuming the raw stream of pixel data is collected in Bayer format, various interpolation techniques may be implemented to determine blue and red values for green pixels, green and red values for blue pixels, and blue and green values for red pixels. Consider an interpolation technique that interpolates green channel values (for red and blue pixels) by applying a low pass direction filter on the green channel and a high pass (or gradient) filter on an adjacent color channel (e.g., red or blue). In some embodiments, only the low pass direction filter may be applied to interpret the green channel value. Similarly, the interpolation technique may interpolate red and blue pixels using a low pass filter on neighboring red or blue pixels and a high pass (or gradient) filter using co-located green values (original or interpolated depending on the current pixel location).

As indicated at 550, in some embodiments, the converted pixel data may be saved to memory, as indicated at 552. For instance, a central control module or other component may be programmed to direct the ISP to store a full-resolution, full-color version of the image in memory. In at least some embodiments, the image may be resampled before being stored in memory (in order to save memory bandwidth when storing the full-color image data). For example, image data converted to YCbCr 4:4:4 format may be subsampled to a different format, such as YCbCr 4:2:2, YCbCr 4:2:0, or YCbCr 4:4:0, which reduces the amount of storage needed for the image than if the image were stored in YCbCr 4:4:4 format (as the chrominance components are reduced without reducing the luminance component). Whether the image data is stored to memory or not, the converted pixel data may continue processing through subsequent image processing stages (as indicated by the arrow from 552 to 560 or the negative exit from 550). Note that image data may continue processing while it is also being stored to a memory and thus the various elements as illustrated in FIG. 5 do not preclude the possibility of performing certain elements in parallel.

In some embodiments, the stream of converted image data stored at 552 may be reinjected into the image processing pipeline to be processed according to elements 560, 570, and 580. In this way, higher resolution image data that has been converted to a full color domain may be processed by the rest of the image processing pipeline. For example, the stored image data may be processed in parts (e.g., strips) using spare cycles in the image processing pipeline (e.g., when the pipeline is not processing a frame from the image sensor). This allows a higher resolution image to be processed efficiently. A similar technique to reinject image data from memory may be performed for image data stored at 532.

The stream of converted image data may, in various embodiments, be scaled by the ISP to a data size that is less than an initial data size for the image, as indicated at 560. For instance, an image sensor may capture a large number of pixels for an image (e.g., 12 megapixels) at full resolution. The ISP may process the stream of pixel data for the full-resolution image through raw processing pipelines stages (as indicated at elements 510-530) and may be converted into a full-color and full-resolution version of the image. The ISP may then scale the image down to a smaller data size (e.g., 3.1 mega pixels ¼ of the original resolution) which may be processed, as indicated at element 570, for storage (e.g., as part of a 1080p video recording) or display (as a preview image). In some embodiments, other image processing operations may be performed as part of the scaling or along with the scaling (at the initial data rate), such as operations to correct or suppress image artifacts. Dot artifacts, for instance, may be removed by comparing a pixel value (e.g., a luminance channel (Y) value) with neighboring pixels and modifying the pixel value based on comparisons between the pixel value and the neighboring pixel values. In some embodiments, color aliasing artifacts may be removed (e.g., by attenuating color components such as Cr and Cb according to a filtered portion of a luminance channel component (Y)).

As indicated at 570, the stream of scaled image data may be processed through other pipeline stage(s) at the ISP that process pixels according to a different rate of pixels per clock cycle that is less than the initial rate, in various embodiments. For instance, consider the example initial rate of 4 ppc given above at element 520. The different rate of pixels per clock cycle may be 2 ppc. The other pipeline stage(s) may be one or more collections of units, components, or other processing operations performed upon the stream of scaled image data at the ISP. The pipeline stages may, in some embodiments, be the various stages or components in back-end 340, discussed above with regard to FIG. 3. For instance, gamma/de-gamma mapping, color space conversion, temporal filtering, noise filtering, luma sharpening, chroma noise reduction, local tone mapping, gain/offset/clip, color correction, three-dimensional color lookup, color space conversion, or various formats of rescaling may be performed at the different rate of pixels per clock cycle.

The stream of scaled pixel data processed through the other pipeline stage(s) may be provided for display, as indicated at 580. For instance, the processed image data may be written directly to a display controller or a memory or other intermediary for subsequent display. In some embodiments, the stream of scaled pixel data may be written to persistent storage as part of a series of image frames that make up a video recording or stored as fully-processed version of an image (as opposed to an image version stored at 532 or 552).

Figure 6:
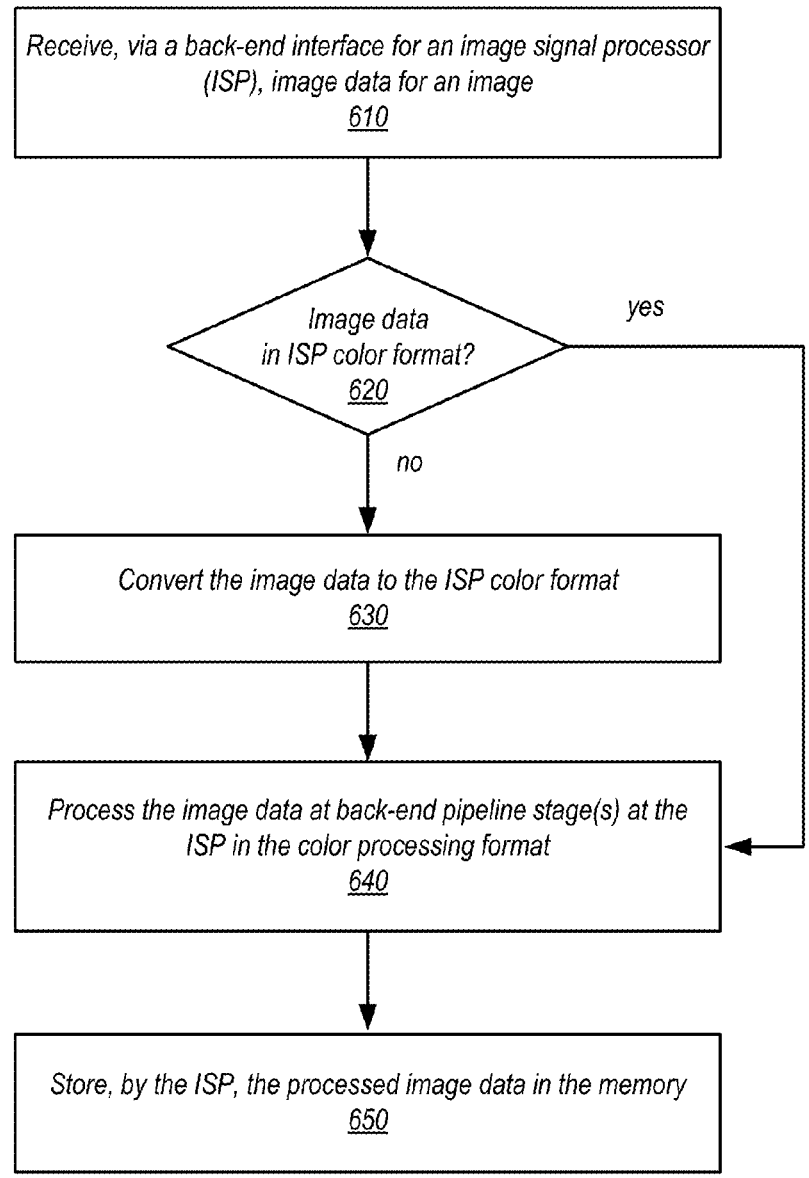
FIG. 6 is a high-level flowchart illustrating various methods and techniques for processing image data received via a back-end interface for an image signal processor, according to some embodiments.

In addition to processing image data collected from an image sensor, in various embodiments image data collected from other sources, whether remote from a device implementing the image processing pipeline (e.g., a content provider or a mobile computing device that sent the image data), or generated at a same device implementing the image processing pipeline (e.g., image data generated by an a software application, such as graphics generated for a game) may be processed at different pipeline stages of the image processing pipeline. In this way, multiple different image processing tasks may be performed utilizing the efficient and dedicated components of the image processing pipeline, such as those described above for ISP 106 in FIG. 3. In at least some embodiments, a back-end interface may be implemented for an image signal processor in order to make different pipeline stages of the image processing pipeline available for processing the image data received from different sources. FIG. 6 is a high-level flowchart illustrating various methods and techniques for processing image data received via a back-end interface for an image signal processor, according to some embodiments.

As indicated at 610, image data for an image may be received via a back-end interface for an image signal processor (ISP), in various embodiments. The back-end interface may be configured to obtain image data from a memory (or other accessible location) that was received from a source different than an image sensor coupled to the ISP, in various embodiments. For instance, a central control module may be programmed to direct the back-end interface to obtain a portion of image data from a memory and stream the image data into the ISP for processing pipeline stages. In some embodiments, the ISP may be programmed to process portions of image data received via the back-end interface with portions of image data collected from the image sensor couple to the ISP.

As indicated at 620, in some embodiments, a determination may be made as to whether the image data is in a color format processable by the ISP. If yes, then as indicated by the positive exit from 620, the image data may be directed to the back-end pipeline stage(s) at the ISP for processing.

If not, then as indicated by the negative exit from 630, the image data may be converted to the ISP color format, as indicated at 630. For example, input to the back-end pipeline stages may be restricted to a particular full-color format, such as YCbCr 4:4:4 or RGB. The image data received via the back-end interface may be formatted differently, such as in an image format specific to a particular video or still image encoding (e.g., mpeg video files which may include image frames in YCbCr 4:2:0 color format or JPEG images may have images in 4:2:0 color format). The back-end interface (or other ISP component) may, for example, be configured to up-sample received image data in YCbCr 4:2:0 color format into YCbCr 4:4:4 format (e.g., by first performing a vertical interpolation to convert the image data into YCbCr 4:2:2 and then applying a horizontal interpolation to convert the image data into YCbCr 4:4:4), increasing the chrominance components of the image data. In some embodiments, the image data received via back-end interface may have multiple planes (e.g., two plane image data instead of one plane image data), in which case the conversion of the image data may be performed for each plane of the image data.

As indicated at 630, the image data in the color processing format may be processed at back-end pipeline stage(s) at the ISP, in various embodiments. As discussed above with regard to FIGS. 3 and 5, back-end pipeline stages may include various components, modules or stages to perform gamma/de-gamma mapping, color space conversion, temporal filtering, noise filtering, luma sharpening, chroma noise reduction, local tone mapping, gain/offset/clip, color correction, three-dimensional color lookup, color space conversion, or various formats of rescaling, in some embodiments. The image data processed through the backend pipeline stage(s) may be stored, by the ISP to the memory, as indicated at 650, or otherwise provided for display, storage, or further processing.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
an image signal processor that comprises:
one or more front-end pipeline stages that processes pixels at an initial rate of pixels per clock cycle;
a scaler; and
one or more back-end pipeline stages that processes pixels at a different rate of pixels per clock cycle that is less than the initial rate of pixels per clock cycle, wherein the one or more back-end pipeline stages process the pixels subsequent to the one or more front-end pipeline stages;
the image signal processor, configured to:
receive a stream of pixel data collected at an image sensor according to an initial data size for an image frame;
process the stream of pixel data through the one or more front-end pipeline stages of the image signal processor;
scale, by the scaler, the stream of pixel data to a data size that is less than the initial data size for the stream of pixel data;
process the stream of scaled pixel data through the one or more back-end pipeline stages; and
provide the stream of scaled pixel data processed through the one or more back-end pipeline stages for display of the image frame.

2. The apparatus of claim 1, wherein the image signal processor is further configured to write the stream of pixel data processed through the one or more front-end pipeline stages to a memory such that the image frame is written to the memory according to the initial data size.

3. The apparatus of claim 1,
wherein the image signal processor further comprises a demosaic unit;
wherein the stream of pixel data collected at the image sensor is raw pixel data;
wherein the image signal processor is further configured to:
convert, by the demosaic unit the stream of pixel data processed through the one or more front-end pipeline stages into a full-color domain, wherein the converted stream of pixel data comprises a luminance component and one or more chrominance components; and
resample, by the scaler, the converted stream of pixel data to reduce the one or more chrominance components without reducing the luminance component; and
write the resampled stream of pixel data to a memory.

4. The apparatus of claim 3, wherein the image signal processor is further configured to:
access the memory to obtain the resampled stream of pixel data;
convert the resampled stream of pixel data to increase the one or more chrominance components; and process the resampled stream of pixel data with the increased one or more chrominance components through the one or more back-end pipeline stages.

5. The apparatus of claim 1,
wherein the image signal processor further comprises an image processing interface for the one or more back-end pipeline stages, wherein the one or more back-end pipeline stages process pixels according to a particular color format;
wherein the image signal processor is further configured to:
receive a stream of other pixel data via the image processing interface in a color format different than the particular color format;
convert, by the image processing interface, the stream of other pixel data to the particular color format; and
process the stream of other pixel data converted to the particular format through the one or more back-end pipeline stages.

6. The apparatus of claim 5, wherein the apparatus comprises the image sensor and wherein the stream of other pixel data is not collected at the image sensor.

7. The apparatus of claim 1, wherein the apparatus comprises a mobile computing device.

8. A method, comprising:
receiving, at an image signal processor, a stream of raw pixel data collected for an image frame according to an initial data size;
directing the stream of raw pixel data through one or more pipeline stages of the image signal processor that process pixels at an initial rate of pixels per clock cycle;
converting, by the image signal processor, the stream of raw pixel data into a full-color domain;
scaling, by the image signal processor, the stream of converted pixel data to a different data size that is less than the initial data size; and
directing the stream of scaled pixel data through one or more other pipeline stages at the image signal processor that process pixels at a different rate of pixels per clock cycle, wherein the different rate of pixels per clock cycle is less than the initial rate of pixels per clock cycle.

9. The method of claim 8, further comprising storing, by the image signal processor, the stream of raw pixel data processed through the one or more pipeline stages to a memory.

10. The method of claim 8, further comprising storing, by the image signal processor, the stream of converted pixel data to a memory.

11. The method of claim 10, wherein the converted stream of pixel data comprises a luminance component and one or more chrominance components, and wherein storing the stream of converted pixel data comprises resampling the converted stream of pixel data to reduce the one or more chrominance components without reducing the luminance component.

12. The method of claim 10, further comprising:
storing the stream of scaled pixel data processed through the one or more other pipeline stages as a part of a collection image frames in a video recording;
receiving, from the memory, the stream of converted pixel data;
directing the stream of converted pixel data through the one or more other pipeline stages; and
storing the stream of converted pixel data processed through the one or more other pipeline stages as a version of the image frame with a higher image resolution than the video recording.

13. The method of claim 8, wherein the one or more pipeline stages are front-end pipeline stages, wherein the one or more other pipeline stages are back-end pipeline stages, and wherein the method further comprises:
receiving, via an interface at the image signal processor for the back-end pipeline stages, a stream of other pixel data; and
processing the stream of other pixel data through the one or more back-end pipeline stages.

14. The method of claim 13, wherein the image signal processor is implemented as part of a mobile computing device, and wherein the stream of other pixel data is received at the mobile computing device over a network from a remote server.

15. A system, comprising:
a device configured to perform image processing, the device comprising:
a sensor interface configured to receive image data from an image sensor; and
an image processing pipeline configured to:
receive, via the sensor interface, a stream of pixel data collected from an image sensor, wherein the image sensor collects the stream of pixel data for an image frame according to an initial data size;
process the stream of pixel data through one or more raw format pipeline stages of the image signal processor that process pixels at an initial rate of pixels per clock cycle;
scale the stream of pixel data to a different data size that is less than the initial data size;
process the stream of scaled pixel data through one or more full-color pipeline stages that process pixels at a different rate of pixels per clock cycle, wherein the different rate of pixels per clock cycle is less than the initial rate of pixels per clock cycle; and
output the stream of scaled pixel data processed through the full-color pipeline stages.

16. The system of claim 15, wherein the image processing pipeline is further configured to write the stream of pixel data processed through the one or more raw pipeline stages to a memory.

17. The system of claim 16, wherein the image processing pipeline is further configured to:
receive from the memory the stream of pixel data; and
process the stream of pixel data through the full-color pipeline stages.

18. The system of claim 15,
wherein the system further comprises an interface configured to receive image data for processing through the one or more full-color pipeline stages of the image processing pipeline;
wherein the image processing pipeline is further configured to:
receive a stream of other pixel data via the interface from a different source than the image sensor; and
process the stream of other pixel data through the one or more full-color pipeline stages.

19. The system of claim 15, wherein the system is a mobile computing device, and wherein the device is an image signal processor.

20. The system of claim 19, wherein the mobile computing device comprises the image sensor and a display device, wherein the stream of scaled pixel data processed through the one or more full-color pipeline stages is output for display as a preview of the image frame at the display device.

\* \* \* \* \*